R. HERMAN.
TIRE.
APPLICATION FILED JULY 20, 1907.
961,443.
Patented June 14, 1910.
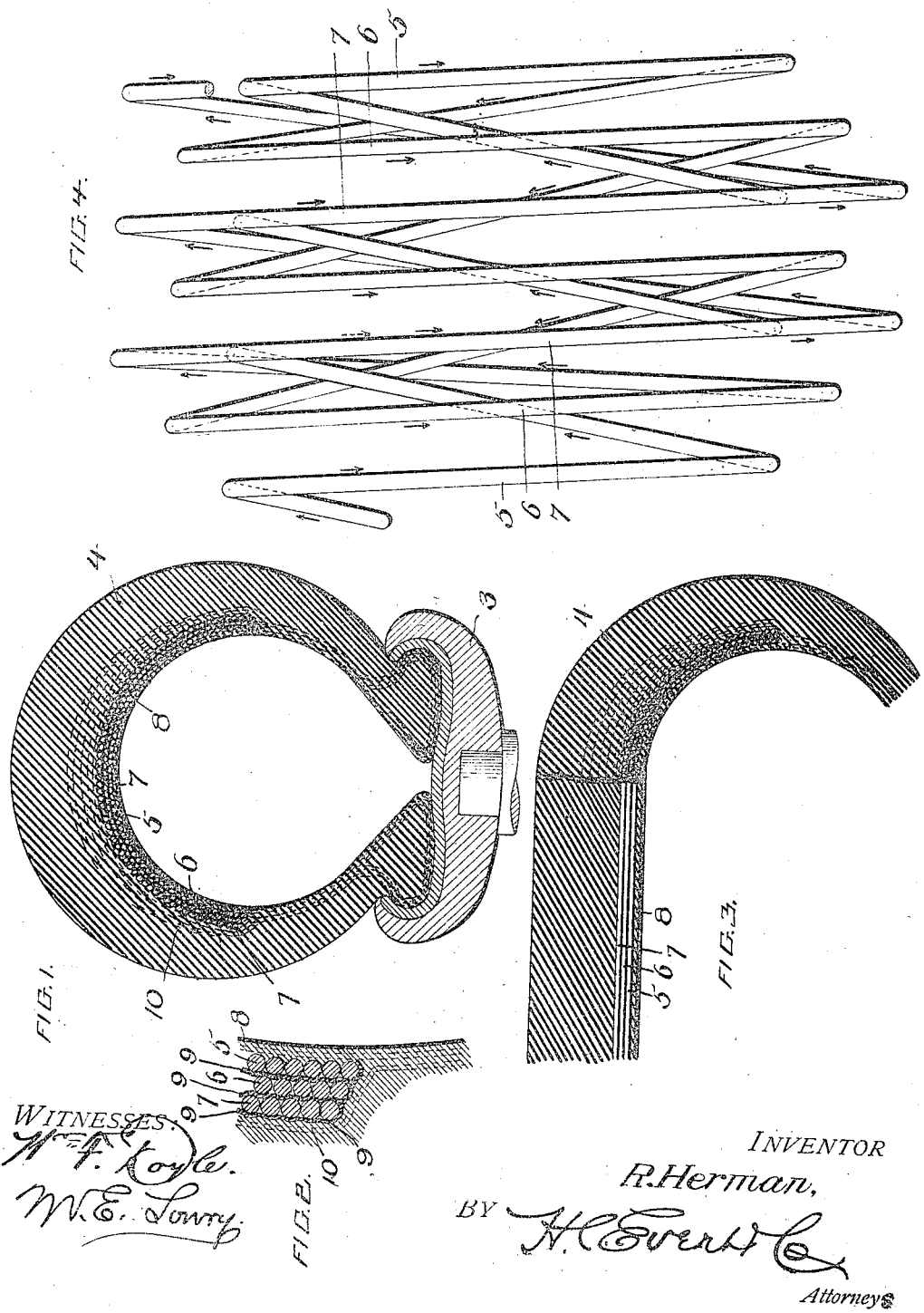
WITNESSES
INVENTOR
R. Herman,
BY
Attorneys

UNITED STATES PATENT OFFICE.

REINHOLD HERMAN, OF CRAFTON, PENNSYLVANIA.

TIRE.

961,443.

Specification of Letters Patent. Patented June 14, 1910.

Application filed July 20, 1907. Serial No. 384,799.

*To all whom it may concern:*

Be it known that I, REINHOLD HERMAN, a citizen of the United States of America, residing at Crafton, in the county of Allegheny and State of Pennsylvania, have invented certain new and useful Improvements in Tires, of which the following is a specification, reference being had therein to the accompanying drawing.

This invention relates to tires, particularly designed for motor-driven and other vehicles.

The invention has for its object to provide a novel non-penetrable outer tube or tire for shielding and preventing the inner or air tube of the tire from being punctured or injured to such extent as to render the same useless until repaired.

A further object of the invention is to provide means to resist the outward stress when the inner tube is inflated, and thereby effect a secure retention of the marginal portions of the outer tube in the rim which holds same.

The invention aims to provide practically an indestructible tire, the said tire embodying, or being reinforced by a metallic resilient shield arranged in the outer tube, and so positioned as to protect the inner or air tube of the tire from damage by sharp objects which may penetrate or enter the tread of the outer tube. And, the invention further aims to increase the efficiency, durability, and longevity of the tire, as well as to effect a greater durability of a vehicle equipped with the tires.

Still further, it is the aim of the invention to increase the rigidity of the tire without impairing the resilient requirements essential in pneumatic tires for motor-driven and other vehicles.

The invention will be hereinafter specifically described and claimed, and in such description, reference will be had to the accompanying drawings forming a part of this specification, and wherein like numerals of reference indicate like parts throughout the different views of the drawings, in which:

Figure 1 is a transverse sectional view of a tire constructed in accordance with my invention, showing same clamped in the wheel rim. Fig. 2 is an enlarged detail sectional view of a part of the tire showing the manner in which the wire layers are superposed. Fig. 3 is a partial transverse and partial longitudinal sectional view of the tire, and Fig. 4 is a perspective diagram showing the convolutions of the single wire from which the superposed wire layers are formed.

In the drawings, 4 designates the outer tube which is shown in Fig. 1 as of the "clencher" type and engaged with a wheel rim 3.

Before describing the specific construction shown to illustrate my invention, I will describe the construction generally, and set forth the advantages resulting therefrom.

Generally stated, the invention consists in providing a plurality of continuous layers of wire in the shoe of the outer tire, these layers of wire being superposed and held in place by layers of rubber between the layers of wire, the rubber being vulcanized so as to bind the superposed layers of wire together, these layers of wire serving to form a shield to prevent puncture of the inner tube by nails or other sharp objects over which the tire may pass. The superposed layers of wire are so disposed one on the other that each strain of a superposed layer is supported against lateral movement by two strands of the layer on which it is superposed. Besides, however, action in this capacity, these layers of wire serve also as a protection against and preventative of "blow-outs" in the inner tube since the layers of wire form practically a solid wall in the shoe, the same as the rim of the wheel forms a solid support. Since there is thus formed a solid wall in the shoe which cannot be expanded by the inflation of the inner tube any more than the rim of the wheel can be expanded by such inflation, it is evident that the diameter of the shoe cannot change, and there is thus two solid walls for the tube to expand against, namely, the wire layers forming the shield, and the rim of the wheel. It will be readily perceived that the expansion of the inner tube being resisted at two opposite sides, it would require an air pressure greatly in excess of that to which tires of this character are ever subjected, to "blow" or injure the inner tube since the continuous wire layers or strands placed on the inside of the shoe absolutely prevent any expansion of the rubber covering placed on the outside of these layers of wire. Another advantage resulting from this construction, is, that since the inner tube pressure is supported by the outer shoe, which latter cannot expand circumferentially as afore stated, the pressure will re-act in proportion to its surface against the clencher portion of the tire, and serve thereby to lock the shoe proper onto the rim, preventing possible chance of the clencher being pulled out of the rim due to excess stress being placed thereon. This will be evident, since it will be observed from the foregoing, that the inner tube can only expand to the actual inside diameter of the shoe, and at this point is resisted by the solid wall formed by the layers of continuous wires.

Specifically described, my invention consists in providing the outer tube of a tire with a metallic reinforcement and shield which is herein shown as embodying a plurality of superposed layers of wires, designated respectively 5, 6, and 7, the wires of each layer being wound circumferentially with the wires or strands of one layer staggered with respect to the wires or strands of the other layers whereby it will be impossible for a penetrating-object passing between two strands of the outer layer to penetrate or pass through between the strands of the other layers. This will be evident from an inspection of the drawings, as it will be observed that should a penetrating-object pass between two strands of the outer layer 7, the point of such object would strike a strand of the intermediate layer 6, the strands of the said intermediate layer 6, being disposed so as to guard the interstices or spaces between adjacent strands of the outer layer 7. Such engagement of the point of an object with a strand of the intermediate layer 6, would cause the point to be deflected substantially at a right angle to its point of entry, and, in order for the point to pass between two strands of the intermediate layer 6, it would be necessary for the point to be again deflected, and this time at a right angle to the line of its first deflection, which second deflection would scarcely take place under any conditions, as the first deflection given to the point of the penetrating-object would direct it between the outer layer 7 and the intermediate layer 6, and if further inward movement of the body of the penetrating-object occurred, the tendency of the penetrating-point would be to travel between the two layers of wire. But, if for any cause, the penetrating point of the object should happen to pass the strands of the intermediate layer of wires, the inner layer 5 would arrest its inward movement, since the strands of this layer are so disposed with relation to the interstices between the strands of the layer 6, as to guard the latter in the same manner that the strands of the layer 6 guard the interstices between the strands of the outer layer 7.

The outer tube or tire is provided with the usual interior sheath 8, usually made of canvas or some tough fabric, and the superimposed layers of wire 5, 6, 7, are disposed within the tread or shoe of the outer tube upon the curved portion of this sheath 8. The superposed layers are separated by sheets of material 9, a sheet of the same material being also provided over the outer layer 7, and extended down over the marginal edges of the several layers. This material is preferably rubber, and then over the superposed layers and outer sheet of the material 9, is placed a protecting-sheath 10, made of canvas or like tough fabric. This protecting sheath I have shown in the present instance as extending down to the clencher which holds the tire, but it will be evident that this sheath may be joined with the inner sheath at a point where it meets with the same after covering the marginal edges of the layers. After the layers have been wound upon the interposed material 9, the whole is vulcanized in the outer tube to effect the permanency of the parts and prevent independent movement of some of the parts with respect to the others.

In the manufacture, the superposed layers 5, 6, and 7, are preferably formed from a single length of good strong, springy wire, such as steel wire, the inner layer 5 being first formed, beginning at one side or marginal edge of the layer, and, when this layer has been completed, the wire is crossed over the marginal strand so as to enter or lie directly above the interstices between the adjacent strands of the layer 5, and the wire rewound to the opposite marginal edge to complete the intermediate layer 6, after which, the wire is again crossed over and again wound to complete the outer layer 7, the strands of this layer, as heretofore stated, being opposite the interstices between the strands of the intermediate layer 6. It is preferable, and the more practical, to form the superposed layers of the shield from a single strand of material as shown and described, and I wish to be understood as claiming these superposed layers broadly; also, I have used the word "wire" in a broad sense to designate the metal strip from which the shield is formed. I desire, however, to call attention to the fact that the superposed layers of the shield are each upon different arcs, and further, that the arcs in which the layers extend are different from the arc of the tire. By this construction, I provide means to resist the outward stress when the inner tube is inflated, thereby moving the marginal portions of the outer tube outwardly, and tending to securely maintain said marginal portions in the rim. I also desire to call attention to the fact that the strands of each layer of wire are mutually supported against lateral movement due to the relative closeness of the wires, and the fact that the strands will not yield to permit one strand to pass over another.

Having fully described my invention, what I claim as new, and desire to secure by Letters Patent is:—

1. In a tire, an outer tube, a plurality of superposed wire layers wound circumferentially of the tube and embedded therein, each strand of a superposed layer being supported against lateral movement by two strands of the layer on which it is superposed.

2. In a tire, an outer tube, and a tire shield therein formed from a single piece of wire wound circumferentially into a plurality of superposed layers, each strand of a superposed layer being supported against lateral movement by two strands of the layer on which it is superposed.

3. In a pneumatic tire, an outer tube having embedded therein a shield formed from a single length of wire wound and crossed upon itself to provide a plurality of superposed layers, the strands of a layer being in abutting engagement and the strands of one layer being in staggered relation with the strands of an adjacent layer.

In testimony whereof I affix my signature in the presence of two witnesses.

REINHOLD HERMAN.

Witnesses:
  GILMORE HERMAN,
  JAMES W. WATSON.